Oct. 2, 1928.

H. M. RYDER 1,686,036

AUTOMATIC TRAIN CONTROL AND CAB SIGNALING

Filed Feb. 3, 1925    2 Sheets-Sheet 1

WITNESSES:

INVENTOR
Harry M. Ryder
BY
ATTORNEY

Oct. 2, 1928.

H. M. RYDER 1,686,036

AUTOMATIC TRAIN CONTROL AND CAB SIGNALING

Filed Feb. 3, 1925    2 Sheets—Sheet 2

WITNESSES:
Carl J. Loench
W. R. Coley

INVENTOR
Harry M. Ryder
BY
Wesley G. Carr
ATTORNEY

Patented Oct. 2, 1928.

1,686,036

UNITED STATES PATENT OFFICE.

HARRY M. RYDER, OF SHARPSBURG, MARYLAND, ASSIGNOR TO WESTINGHOUSE ELECTRIC & MANUFACTURING COMPANY, A CORPORATION OF PENNSYLVANIA.

AUTOMATIC TRAIN CONTROL AND CAB SIGNALING.

Application filed February 3, 1925. Serial No. 6,551.

My invention relates to automatic train-control systems and signaling devices.

One object of my invention is to provide a system of control for a railway vehicle whereby it will be impossible for an engineman to run past "stop" signals.

Another object of my invention is to provide means for signaling to the engineer the traffic conditions of the track over which the vehicle is operated.

Still another object of my invention is to provide means for stopping a railway vehicle within any block when the next block contains a vehicle traveling over the same track.

A further object of my invention is to provide means for energizing the rails over which a vehicle operates with electrical energy of different frequencies, in accordance with traffic conditions.

A further object of my invention is to automatically govern the speed of a vehicle in accordance with the frequency of the electrical current traversing the rails over which the vehicle travels.

Still another object of my invention is to provide means for preventing electrical energy from being dissipated through those axles of a vehicle which do not have some part of an automatic signaling device or control system mounted thereon.

Briefly speaking, my invention comprises the energizing of the rails of a section of track in accordance with traffic conditions, and providing means mounted upon a locomotive and responsive to electrical energy traversing the rails for governing signal lights and also a pneumatic valve for controlling the air-brakes of a vehicle.

My invention also comprises mounting a laminated iron core upon the axles of a locomotive or motor vehicle for preventing signal currents from traversing parts of vehicles other than the axle or axles that are provided with a mechanism adapted to operate the signal devices.

Reference may now be made to the accompanying drawings, Figure 1 of which is a diagrammatic view—partly in plan and partly in side elevation—of several sections of track with the wheels of a railway vehicle mounted thereon. The track is energized with signaling currents by means of electrical devices that will hereinafter be more fully described.

Figure 1:
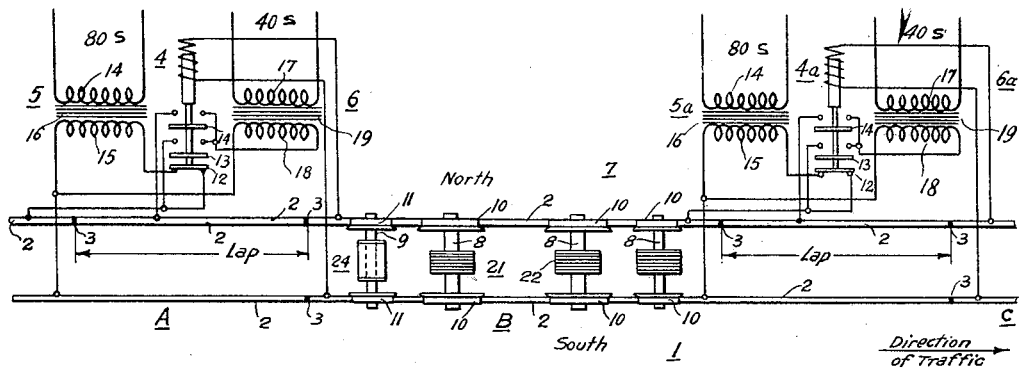

Referring particularly to Fig. 1, a track 1 is provided with a plurality of parallel-extending rails 2 that are separated, one from another by a plurality of section breaks or insulated joints 3, which are made from any suitable insulating material, such, for example, as wood.

Fig. 1 shows three sections of track respectively marked A, B, and C. A plurality of relays 4 and 4a and a plurality of transformers 5, 5a, 6 and 6a are provided for governing the energization of the rails 2. The rails 2 of the track 1 are designated as the north and the south rails, for the sake of convenience.

A vehicle or train 7, of which only a small number of axles 8 and 9 and corresponding pairs of wheels 10 and 11 are illustrated, is movably mounted on the rails 2.

Each of the relays 4 and 4a is provided with a plurality of movable contact members 12 to 14, inclusive, and with an actuating coil, which is electrically connected to the rails 2 of the corresponding section.

Each of the transformers 5 and 5a is provided with a primary winding 14, a secondary winding 15 and a magnetizable core member 16. Each of the transformers 6 and 6a is provided with a primary winding 17, a secondary winding 18 and a magnetizable core member 19.

The primary windings 14 of the transformers 5 and 5a are supplied with electrical energy of a frequency of 80 cycles while the primary windings 17 of the transformers 6 and 6a are energized from a source of electrical energy of a frequency of 40 cycles. It is to be understood, however, that electrical energy of different frequencies than 80 cycles and 40 cycles may be employed for operating my control system without departing from the spirit of my invention.

Figure 3:
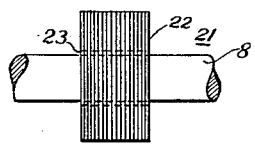
Figs. 3 and 4 are views, in side and in end elevation, respectively, of a laminated iron core mounted upon one of the axles of the vehicle illustrated in Fig. 1 of the drawing.
Figure 4:
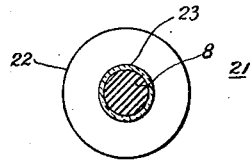

Each of the axles 8 of the locomotive 7 is provided with a reactance device 21, which is best illustrated in Figs. 3 and 4 of the drawing. The reactance device 21 comprises a plurality of laminated flat annular members or discs 22 which are made of iron. The discs 22 are separated from the axle 8 by means of a ring 23 which is made of some suitable insulating material, such, for example, as micarta.

The object of mounting the reactance devices 21 upon the axles 8 is to increase the electrical impedance of the circuits comprising the wheels 10 and the axles 8, thereby substantially preventing the energy that governs the signal devices and control apparatus from being dissipated through those axles.

Figure 2:
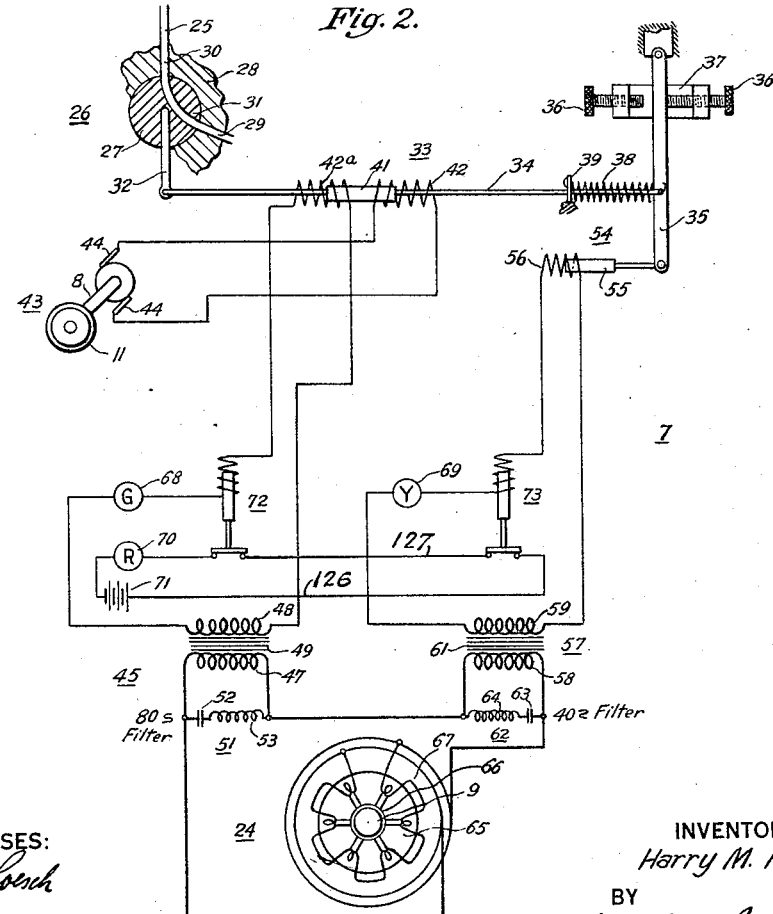
Fig. 2 is a diagrammatic view of the control system of a vehicle, mounted thereon and employed to govern the speed of the vehicle in accordance with traffic conditions. This automatic control system for a vehicle also provides means for automatically signaling the engineer concerning the condition of the traffic upon the track over which the vehicle is traveling.

The axle 9 is provided with a transformer 24, which is best illustrated in Fig. 2 of the drawing.

Referring particularly to Fig. 2 of the drawing, the portion of the locomotive 7 that automatically governs the speed thereof is illustrated herein. An air-brake pipe 25 is employed to govern the operation of the air-brakes (not illustrated) of the vehicle 7. The brake pipe 25 is directly connected to a pneumatic valve 26 which comprises a rotatable member 27, and a stationary member or casing 28. The stationary member 28 is provided with an outlet port 29 that opens into the atmosphere and an inlet port 30 that is directly connected to the pipe 25.

The rotatable member 27 is provided with an air duct 31, which is so designed that it may be rotated until it pneumatically connects the inlet port 30 with the outlet port 29, thereby releasing the fluid under pressure within the brake pipe 25. When fluid pressure in the brake pipe 25 is thus reduced, the air-brakes of the vehicle 7 are applied, in accordance with familiar principles. The rotatable member 27 may be actuated either in a clockwise or in a counter-clockwise direction by means of a lever member 32 which is governed by an electro-magnetic device 33. The lever 32 is pivotally connected to a rod or bar 34 which constitutes a portion of the electro-magnetic device 33. The bar 34 is mechanically connected to a pivotally mounted bar or lever 35. The limit of travel of the arm 35 is governed by a plurality of screws 36 which are adjustably mounted in a stationary block 37.

The lever 35 is biased to the position illustrated in Fig. 2 of the drawings by means of a resilient member or compression spring 38 which is compressed against a stationary bracket member 39. When the resilient member 38 actuates the lever 35 to this position, the lever 32 actuates the rotatable member 27 of the pneumatic valve device 26 to the position illustrated. The fluid, under pressure, in the brake pipe 25 is thereupon exhausted, through the inlet port 30, air duct 31 and outlet port 29, to the atmosphere. When the air pressure is reduced in the air-brake pipe 25, the brakes (not illustrated) of the vehicle 7 are applied, as previously set forth.

The operation of the rod 34 may also be effected by a magnetizable core member 41 and a plurality of coils 42 and 42a which constitute portions of the electro-magnetic device 33, in a manner hereinafter more fully described. The energization of the coil 42 is effected by means of a generator 43 which comprises a plurality of brush members 44 that are connected to the coil 42. The generator 43 is mechanically connected in any suitable manner, to an axle 8 of the vehicle 7 to be driven thereby.

The generator 43 is so designed that the voltage across the brushes 44 is directly proportional to the speed of the vehicle 7. When the speed of the vehicle 7 is relatively high, the actuating coil 42 of the electrical control device 33 is so energized that it assists the compression spring 38 to actuate the rod 34 to the right and, hence, the rotatable member 27 of the valve device 26, in a counter-clockwise direction, to effect application of the brakes.

The energization of the coil 42a is governed by a transformer 45, in a manner hereinafter more fully described. The transformer 45 is provided with a primary winding 47, a secondary winding 48 and a magnetizable core member 49.

A resonant device 51, comprising a condenser 52 and a reactance coil 53, is employed to provide a shunt circuit or filter for electrical energy of a frequency of 80 cycles. An electrical device 54, which comprises a part of the electrical control device 33, embodies a magnetizable core member 55, that is mechanically connected to the lever 35, and an actuating coil 56. The energization of the coil 56 is governed by a transformer 57 which comprises a primary winding 58, a secondary winding 59, and a core member 61. A resonant device 62 comprises a condenser 63 and a reactance coil 64. The resonant device 62 is employed to provide a shunt circuit or filter across the primary winding 58 of the transformer 57 for electrical current of a frequency of 40 cycles.

The axle transformer 24 is provided with a laminated iron core 65 which is mounted upon a suitably insulated cylindrical member 66. A secondary winding 67 is wound upon the laminated iron core 65. The primary winding of the transformer 24 comprises the axle 9. The secondary winding 67 of the transformer 24 is connected in series relation with the primary windings 47 and 58 of the transformers 45 and 57, respectively. The axle 9 is energized by the electrical current traversing the rails 2 of the track 1, as will be understood.

A plurality of signal lamps 68 to 70, inclusive, are provided for indicating to the engineer the traffic conditions of the track over which the vehicle 7 is operating. The signal lamps 68 to 70, inclusive, are of three different colors: 68 being green, which indicates a clear track; 69 being yellow, which indicates caution because a train is located in the second block ahead of the vehicle 7 and on the same track; and 70 being red, which indicates that a vehicle is located in the next block ahead of the vehicle 7 if vehicle 7 is located in "lap area", otherwise meaning that a leading vehicle is located in the same block. The lamps 68 to 70, inclusive, will be referred to as the clear, caution and stop signals, respectively.

A source of electrical energy, such as a headlight generator or a storage battery 71, is provided for energizing the red lamp 70. A plurality of relays 72 and 73 are provided for governing the energization of the red lamp 70 in a manner hereinafter more fully described.

The actuating coil of the relay 72 is connected in series relation with the green lamp 68. The actuating coil of the relay 73 is connected in series relation with the yellow lamp 69. When either the green lamp 68 or yellow lamp 69 is lighted, the corresponding relay 72 or 73 is actuated to its open position and the red lamp 70 is deenergized.

The operation of my automatic train-control system is as follows: When a vehicle corresponding to the vehicle 7 occupies track 1 in block B, the actuating coil of the relay 4 is short circuited by the axle 9 of vehicle 7, and the relay 4 occupies its lower position.

A circuit is thereupon established from one of the south rails 2 of section A of the track, through the secondary winding 15 of the transformer 5 and contact member 12 of the relay 4, to the north rail 2 of the western half of the section of track marked A. The rails 2 of the western half of the section of the track marked "A" are then energized with a current of a frequency of 80 cycles. The rails 2 of the eastern half of the section of track marked A are not energized when the relay 4 occupies its lower position. Assuming now that a vehicle similar to the vehicle 7 moves into the deenergized half of the section A of the rails 1, then there is no voltage impressed upon the primary winding 9 of the transformer 24. Therefore, the transformers 45 and 57 are not energized. Under such operating conditions the relays 72 and 73 are closed.

As illustrated when the relays 72 and 73 are closed, a lighting circuit for the lamp 70 is established, which extends from the battery 71 through conductor 126, relay 73, conductor 127, relay 72, lamp 70 back to the battery.

When the vehicle 7 has traveled into section C, the relay 4a occupies its lower position, thereby establishing a circuit from the transformer 5a, through contact member 12 of the relay 4a, to a rail 2 of the western half of section B. The rails of the western half of section B are thereby energized with a current of 80 cycles frequency. The rails 2 of the eastern half of section B are de-energized, Fig. 1 illustrating the position of relay 4a under the conditions assumed.

The operation of my control system is such that, when the opposite rails 1 are not energized, the brakes are applied and the red light 70, illustrated in Fig. 2 of the drawing, is lighted. When the opposite rails 1 are energized with a current of 80 cycles frequency, the brakes are not applied unless the speed is relatively high. At such time, the yellow lamp 69 is lighted to warn the engineer to exercise caution. Therefore, if another vehicle approaches section C of the track 1, its automatic control apparatus will be energized in the first half of section B by a current of 80 cycles, thereby energizing the lamp 69 and applying the brakes, if the speed is too high, to bring the train to a safe stop within the proper "lap" of distance.

When the vehicle 7 occupies section C of the track, the relay 4a occupies its lower position, thereby energizing the western half of section B with a current of 80 cycles frequency, the relay 4 of section B occupies its upper position by reason of the energization of its actuating coil. When the relay 4 of section B occupies its upper position, a circuit is established from the south rail 2, through the secondary winding 18 of the transformer 6, contact member 14 of the relay 4, to a north rail 2 of the eastern half of section A. The rails 2 of section A, consequently, are energized with a current of 40 cycles.

The rails of the western half of section A are also energized with an electrical current of 40 cycles, by means of a circuit that is established from the south rail 2 of section A, through the secondary winding 18 of the transformer 6 and contact member 13 of the relay 4, to the north rail 2 of the western half of section A. In other words, in all sections of track which are unoccupied by vehicles, the normal electrical condition of the rails is that they are energized by a current of 40 cycles, which indicates that the track is clear. However, in a section of track just behind a section occupied by a vehicle 7, the lap portion of the section that is adjacent to the occupied section of track is completely deenergized, which sets in operation the control system of the vehicle to bring it to a stop. The rails of the remainder of the same section are energized by a current of 80 cycles, which indicates that the vehicle is approaching another vehicle.

Referring to Fig. 2 of the drawing, the auxiliary transformer 24 is energized normally by a current of 40 cycles traversing the axle 9. The energization of the axle 9, in turn, energizes the secondary winding 67 of the transformer 24. The energization of the secondary winding 67 of the auxiliary transformer 24 effects the energization of the primary winding 47 and hence of the secondary winding 48 of the transformer 45.

The energization of the secondary winding 48 of the transformer 45 effects the energization of the green lamp 68, actuating coil of the relay 72, and actuating coil 42a of the control device 33. The energization of the actuating coil of the relay 72 effects the opening thereof, thus de-energizing the red lamp 70. The energization of the actuating coil 42a actuates the solenoid 41 to the left, thereby closing the pneumatic valve device 26. In other words, when the coil 42a is energized, the next section of track 1 is clear, and there is no necessity for automatically applying the air brakes.

When the current traversing the axle 9 is of 80 cycles frequency, the secondary winding 67 of the auxiliary transformer 24, and hence the primary winding 58 of the transformer 57, is energized with a current of 80 cycles frequency. When the primary winding 58 is energized, the secondary winding 59 of the transformer 57, and hence the yellow lamp 69, actuating coil of the relay 73 and actuating coil 56 of the electrical device 54 are energized.

When the yellow lamp 69 is energized, it indicates that the engineer should use caution in approaching the next section of track. When the relay 73 occupies its upper position, the red lamp 70 is de-energized. When the actuating coil 56 of the electrical device 54 is energized, it tends to actuate the core 55 of the relay 54 to the left, thereby actuating the lever 35, rod 34 and lever 32 to effect the closure of the air-brake valve device 26.

Whether or not the air-brake valve device 26 is maintained closed by the energization of the coil 56 of the electrical device 54, depends upon the degree of energization of the coil 42 of the automatic control device 33. The energization of the coil 42 is directly proportional to the speed at which the generator 43 is driven. In other words, if the vehicle is traveling at a high rate of speed, the coil 42 will be energized sufficiently to open the brake valve 26 and apply the brakes. When the vehicle is brought below a predetermined speed, the energization of the coil 42 is sufficiently diminished to permit the electrical device 54 to close the valve 26.

When no electrical current is traversing the axle 9, the transformer 24 is de-energized and, hence, both transformers 45 and 57 are also de-energized. When both the transformers 45 and 57 are de-energized, the signal lamps 68 and 69 and the actuating coils of the relays 72 and 73 are likewise de-energized.

When both relays 72 and 73 are de-energized, they occupy their closed positions and establish a circuit from the storage battery 71, through the red lamp 70 and the contact members of the relays 72 and 73 to the battery 71, thereby lighting the red lamp 70. The engineer is given warning, when the red lamp 70 is lighted that he must apply the brakes, as his vehicle is within lap distance, or less, of an occupied block.

When the transformers 45 and 57 are de-energized the actuating coils 42a of the control device 33 and the coil 56 of the electrical device 54 are de-energized, thereby permitting the actuating coil 42 and the resilient member 38 to actuate the pneumatic-brake-valve device 26 to its open position, thus causing the brakes of the vehicle 7 to be applied.

Figure 5:
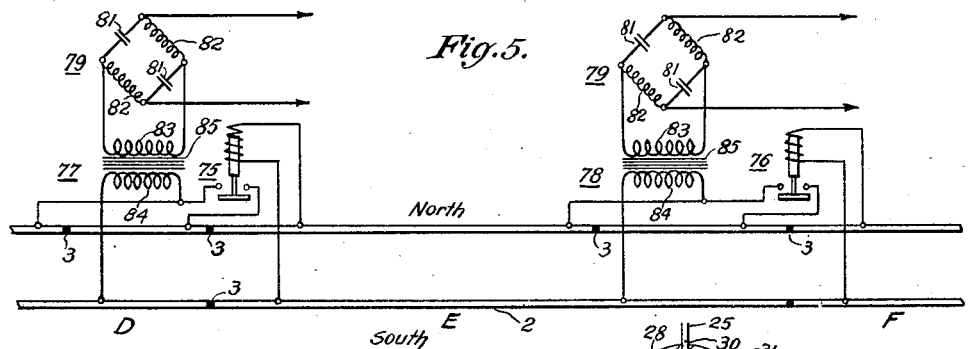
Fig. 5 is a diagrammatic view of several sections of track, the rails of which are energized in a somewhat different manner from that of Fig. 1.

Referring to Fig. 5 of the drawing, a plurality of sections D, E and F of the track are insulated, one from another, by means of insulated joints 3. An insulated joint 3 is also provided in the north rail 2 of the track 1 at lap distance from the east end of the sections. Corresponding relays 75 and 76 and corresponding transformers 77 and 78 are provided for different sections of track. Electrical constant current devices 79—designed in accordance with the principle of the monocyclic square—are provided for energizing each of the transformers 77 and 78.

Each of the electrical devices 79 comprises a plurality of condensers 81 and a plurality of inductance coils 82, all arranged in the form of a square with the condensers 81 on opposite sides of the square. The monocyclic square as formed by the condensers 81 and inductance coils 82 is well understood in the art, and its operation is fully described in many electrical engineering text books. The purpose of the electrical device 79 is to secure, from a source of electrical current of constant voltage, current of an approximately constant value for energizing the rails 2. Each of the transformers 77 and 78 comprises a primary winding 83, a secondary winding 84, and a magnetizable core member 85.

The operation of the control system for energizing the track 1, when the vehicle occupies a section of the track 1, such, for example, as F, is as follows: The actuating coil of the relay 76 is short-circuited through the vehicle, thereby causing the relay 76 to occupy its lower or open position. The rails 2 of the lap portion of section E of the track 1 are de-energized, thereby so influencing the control system of any following vehicle as to bring it to a stop. When the relay 76 occupies its closed position, the rails 2 of the lap portion of section E are energized, and the relay operates the automatic control and signal system of the vehicle to indicate that the next section in advance is clear of vehicle traffic.

Figure 6:
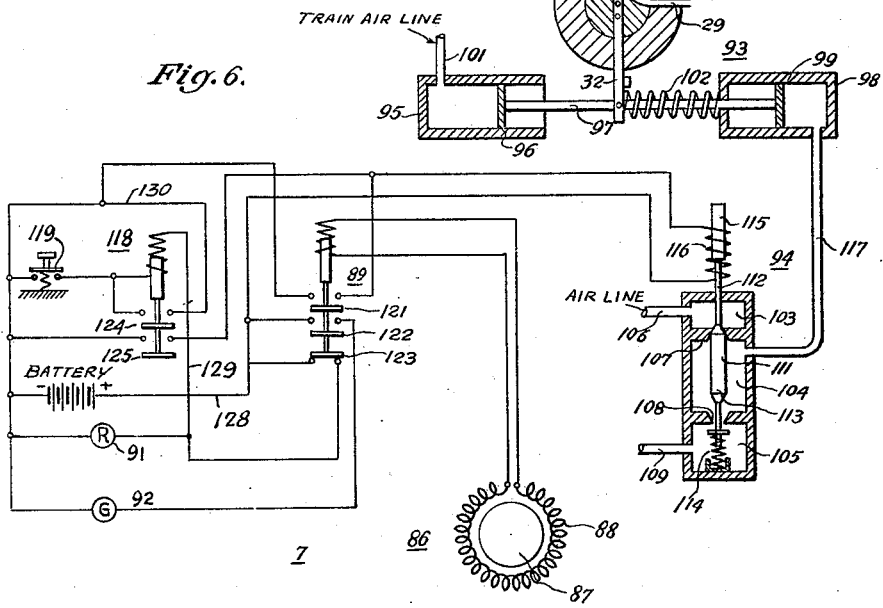
Fig. 6 is a diagrammatic view of an automatic train-control system and signaling device of somewhat different construction from that illustrated in Fig. 2 of the drawings.

Referring to Fig. 6 of the drawing, an auxiliary transformer 86, which is mounted upon the vehicle 7, comprises an axle 87 that constitutes the primary winding thereof, and a secondary winding 88 which is slightly removed from the axle 87. The secondary winding 88 of the transformer 86 is electrically connected in series relation with the actuating coil of the relay 89. A plurality of lamps 91 and 92, corresponding to danger (red) and clear (green), are provided for indicating to the engineer the condition of the traffic in the section of track 1 over which the vehicle is proceeding.

A pneumatic-brake-valve device 26, which is like the brake-valve device 26 of Fig. 1, controls the fluid pressure that governs the operation of the air brakes (not illustrated) of the vehicle 7. The operation of the pneumatic brake valve device 26 is governed by a pneumatic engine 93 and an electro-pneumatic valve mechanism 94.

The pneumatic engine 93 comprises a cylinder 95 and a piston 96 for actuating a rod 97, which is mechanically connected to the lever arm 32 of the brake-valve device 26. The pneumatic engine 93 is provided with a cylinder 98, in which is mounted a movable piston 99. The piston 99 is mechanically connected to the rod 97 which is pivotally connected to the lever arm 32.

The cylinder 95 is connected to the train-line pipe 101, thereby causing fluid pressure to be applied to the piston 96 to actuate it towards the right. The movement of the piston 96 causes the rod 97 to actuate the brake-valve device 26 to its open position to effect an application of the air brakes. A resilient member or spring 102 is so positioned upon the rod 97 that it tends to actuate the rotatable member 27 of the brake-valve device 26 to its closed position so that the brakes may be released.

The fluid pressure supplied from the train-line pipe 101 is sufficient to actuate the piston 96 to the right and to overcome the resistance of the resilient member 102. However, when pressure is brought to bear against the piston 99, the rod 97 is actuated to the left.

The electropneumatic valve 94 is divided into an upper chamber 103, middle chamber 104, and lower chamber 105. The upper chamber 103 is connected to a suitable source of fluid pressure 106 and to the middle chamber 104 by means of an opening or port 107. The middle chamber 104 is pneumatically connected to the lower chamber 105 by means of an opening or port 108. The lower chamber 105 is connected to the outer atmosphere by means of an exhaust pipe 109. The port 107 may be closed by a valve member 111 which is mounted upon the rod 112. The port 108 may be closed by a valve member 113 which is mounted upon the rod 112. The valve member 111 is biased to its upper or closed position, and the valve member 113 is biased to its upper or open position by means of a resilient member or spring 114.

The rod 112 may be actuated downwardly by means of a magnetizable core member 115 and an actuating coil 116. The cylinder 98 is pneumatically connected to the middle chamber 104 of the electro-pneumatic valve 94 by means of a pipe 117. The construction of electro-pneumatic valve 94 is such that, when the actuating coil 116 is de-energized, the valve member 113 occupies its open position, and fluid, under pressure in the cylinder 98, is exhausted, through the pipe 117, chambers 104 and 105 and exhaust pipe 109 to the outer atmosphere.

When the fluid under pressure in the cylinder 98 is released, the fluid pressure against the piston 96 actuates the rod 97 to the right, thereby effecting the opening of the valve device 26 and thus applying the air brakes of the vehicle 7.

When the actuating coil 116 is energized, the core 115 is actuated downwardly and fluid, under pressure, passes from the supply pipe 106 through the upper chamber 103, port 107, middle chamber 104 and pipe 117, to the cylinder 98. The fluid pressure upon the piston 99 actuates the rod member 97 to the left, thereby closing the brake-valve device 26 and permitting the brakes to be released.

A holding relay 118 and a reset push button 119 are provided for the purpose of making possible the release of the brakes only after the train has come to a full stop. The operations of the relay 118 will be more fully described in a subsequent paragraph. The relay 89 is provided with a plurality of contact members 121 to 123, inclusive. The relay 118 is provided with a plurality of contact members 124 and 125.

The operation of the modified form of automatic control system illustrated by Fig. 6 of the drawing will first be described when the rails 2 are de-energized to the rear of a train in the same block and in the lap section of the preceding block. When the rails 2 are de-energized, the transformer 86, which is mounted upon the vehicle 7, and, therefore, the actuating coil of the relay 89 are also de-energized and, consequently, the relay 89 drops to its lower position.

When the relay 89 occupies its lower position, a circuit is established from the source of electrical energy marked "Battery" through the contact member 123 of the relay 89 and red signal lamp 91 to the opposite terminal of the battery. The actuating coil 116 of the electro-pneumatic valve 94 is also de-energized when the relay 89 occupies its lower position as will later appear, thereby permitting the valve member 111 to occupy its closed position and the valve member 113 to occupy its open position to thus effect the release of the fluid pressure from the piston 99.

When the fluid pressure upon the piston 99 is discontinued, the rod member 97 is actuated by the piston 96 in a counter-clockwise direction, thereby actuating the brake-valve device 26 to its open position. As stated previously, when the brake valve device 26 occupies its open position, the brakes of the vehicle 7 are actuated to bring it to a stop.

If the engineer desires to operate the vehicle 7 slowly through this section of track, he must dismount from his cab (not illustrated) and press the push-button 119. When the push-button 119 is pressed, a circuit is established from the positive terminal of the battery, through the contact member 123 of the relay 89, actuating coil of the relay 118 and push-button 119, to the negative terminal of the battery.

Further, upon the actuation of the relay 118, a holding circuit is established which extends from the battery through conductor 128, contact member 123, conductor 129, the actuating coil of the relay 118, contact member 124 and the conductor 130 back to the battery. A circuit is thus established from the positive terminal of the battery, through the actuating coil 116 of the electro-pneumatic valve 94, and contact member 125 of the relay 118 to the negative terminal of the battery. When the actuating coil 116 is energized, fluid pressure is applied to the piston 99, in a manner hereinbefore described, and the brake-valve device 26 is actuated to its closed position, thereby permitting the release of the brakes of the vehicle 7.

When the rails 2 over which the vehicle 7 is traveling are electrically energized, a current is induced by means of the transformer 86 into the actuating coil of the relay 89. When the actuating coil of the relay 89 is energized, the contact members 121 to 123, inclusive, of the relay 89 are actuated to their upper position thereby interrupting any circuits that were established through the contact member 123. The opening of the contact member 123 effects the de-energization of the actuating coil of the relay 118 and of the red lamp 91. When the relay 118 is de-energized, the holding circuit through the contact member 124 of the relay 118 is broken, if it has been established.

When the contact members of the relay 89 occupy their upper positions, the green lamp 92, which indicates a clear track, is energized by a circuit that is established from the source of electrical energy marked "Battery" through the contact member 122 of the relay 89 and green lamp 92 to the negative terminal of the battery.

When the contact members 121 to 123, inclusive, of the relay 89 occupy their upper positions, the actuating coil 116 of the electro-pneumatic valve 94 is energized by a circuit that is established from the positive terminal of the battery through actuating coil 116 of the electro-pneumatic valve 94 and contact member 121 of the relay device 89, to the negative terminal of the battery. As stated heretofore, when relay device 116 is energized, fluid pressure from the supply pipe 106 is applied to the piston 99, thereby actuating the brake-valve device 26 to its closed position, whereby the vehicle brakes are maintained in released position.

From the above description, it is apparent that I have provided a control system for automatically governing the speed of a vehicle in accordance with traffic conditions on the track over which the vehicle is operating. I have also provided means for signaling to the engineer whether his vehicle is operating on a clear track or whether he should lower its speed in view of his vehicle approaching another vehicle within specified limits or whether he should bring his vehicle to a stop.

While I have illustrated and described my invention in its preferred form, it is apparent that minor modifications may be made in the arrangement of circuits and apparatus employed without departing from the spirit of my invention. I desire, therefore, to be limited only by the scope of the appended claims.

I claim as my invention:

1. In an automatic train-control system, the combination with a vehicle having a plurality of axles, of an inductance coil mounted adjacent to one of said axles, braking means comprising a pneumatic valve device for braking said vehicle, means comprising a generator dependent upon the speed of said vehicle for governing said braking means and means comprising a plurality of actuating coils for selectively governing said vehicle in accordance with frequency of the current traversing said coil.

2. In an automatic train-control system, the combination with a railway vehicle, of means comprising a pneumatic valve device for braking said vehicle, a rod for actuating said valve device, a solenoid mounted upon said rod, a plurality of coils for actuating said solenoid in different directions, means comprising a generator for energizing one of said coils, means comprising a transformer and an inductance coil for energizing another of said actuating coils, means comprising a lever and a third actuating coil for actuating said rod, means comprising a second transformer and the same inductance coil for energizing said third actuating coil, and means comprising a reactance device for selectively energizing said transformers in accordance with the frequency of the current traversing said inductance coil.

3. The combination with a vehicle having an axle, of means comprising an annular iron core member for preventing or impeding the flow of electrical energy through said axle.

4. The combination with a vehicle having an axle, of means comprising a laminated annular iron core member mounted upon said axle for preventing or impeding the flow of electrical energy through said axle.

5. The combination with a vehicle having an axle, of means comprising an impedance device positioned adjacent to said axle for preventing electrical energy from traversing said axle.

6. The combination with a vehicle having an axle, of means comprising a laminated member positioned adjacent to said axle for impeding the flow of electrical energy through said axle.

7. The combination with a track having a plurality of rails, of means for electrically insulating groups of said rails to form sections and subsections of track, a plurality of sources of electrical energy of different frequencies, and means for selectively connecting said groups of rails to said sources of electrical energy in accordance with traffic conditions.

8. In a train control system in combination, a plurality of insulated track sections, a vehicle provided with a plurality of truck axles adapted to travel on the track, means for energizing the track sections, means for utilizing one of the axles for collecting energy from the track for operating purposes and means for impeding the flow of current in the other axles.

In testimony whereof, I have hereunto subscribed my name this 20th day of January, 1925.

HARRY M. RYDER.